United States Patent [19]

Johnston et al.

[11] Patent Number: 4,516,818
[45] Date of Patent: May 14, 1985

[54] ENTRANCE TERMINAL FOR TELECOMMUNICATIONS CABLES

[75] Inventors: Harold Johnston, Dorval; Richard E. Benoit, Longueuil, both of Canada

[73] Assignee: Northern Telecom Limited, Montreal, Canada

[21] Appl. No.: 451,811

[22] Filed: Dec. 21, 1982

[51] Int. Cl.³ .............................................. H01R 13/44
[52] U.S. Cl. ................................. 339/36; 339/125 R; 339/198 R; 339/198 G; 179/98
[58] Field of Search ................. 339/18 R, 18 C, 119, 339/125, 147 R, 198 R, 198 G, 198 J, 36; 179/98

[56] References Cited

U.S. PATENT DOCUMENTS

| 3,376,542 | 4/1968 | Vlaminck | 339/125 R |
|---|---|---|---|
| 3,569,906 | 3/1971 | Cohen | 339/198 R |
| 3,784,728 | 1/1974 | DeBortoli et al. | 339/18 B |
| 4,035,051 | 7/1977 | Guy | 339/36 |
| 4,057,692 | 11/1977 | DeBortoli et al. | 339/18 R |
| 4,131,330 | 12/1978 | Stupay | 339/198 R |
| 4,283,106 | 8/1981 | Bunnell | 339/125 R |
| 4,417,781 | 11/1983 | Johnston et al. | 339/198 R |

FOREIGN PATENT DOCUMENTS 1515970  11/1969  Fed. Rep. of Germany ... 339/119 R

Primary Examiner—Joseph H. McGlynn
Assistant Examiner—Gary F. Paumen
Attorney, Agent, or Firm—Sidney T. Jelly

[57] ABSTRACT

In an entrance terminal for a telephone cable, each terminal has an integral cable conductor trough at one side, generally closed by a cover. End walls in the troughs have apertures therein the apertures breaking through the edges of the end walls of the troughs, forming gaps of a width less than the diameter of the apertures. Sleeves extend through the appertures in adjacent end walls of adjacent terminals. By axially sliding a sleeve upward, out of the apertures, it is possible to remove a terminal without disturbing the remainder, as conductors can be eased through the gaps.

12 Claims, 7 Drawing Figures

ENTRANCE TERMINAL FOR TELECOMMUNICATIONS CABLES

This invention relates to an entrance terminal for telecommunications cables. In particular the invention relates to an arrangement of stacked entrance terminals, or interconnect assemblies, in which an integral cable trough is formed at one side with removable sleeves connecting adjacent trough sections. By axial movement of the sleeves, any single terminal or interconnect assembly can be removed and replaced without interference with other, adjacent, terminals.

Broadly the invention comprises an entrance terminal having a cable trough at one side, the trough having top and bottom ends with apertures therein, the apertures breaking through to an edge of the ends, an axially sliding sleeve adapted to fit over the cable at each end of the trough and slidable into and out of the apertures, being retained therein, and a cover for enclosing the trough.

The invention will be readily understood by the following description of a particular embodiment, in conjunction with the accompanying drawings, in which.

Figure 1:
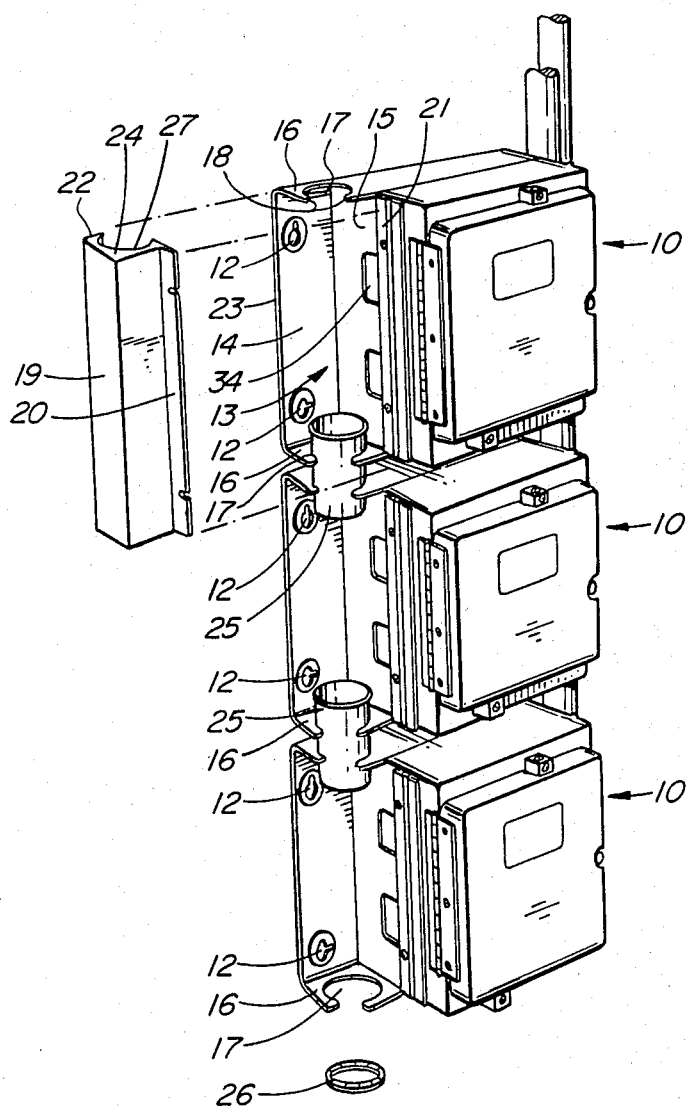
FIG. 1 is a perspective view of three entrance terminals stacked vertically, without cables, one cover being shown.

FIG. 1 shows three terminals 10 arranged in a vertical array. The terminals are normally mounted on a wall, by screws through keyhole shaped holes 12, but may also be mounted on a frame. As shown in FIG. 1, each terminal 10 has a main portion or housing with a trough 13 at one side. The trough is formed by the back 14 and side 15 of the main terminals portion. Top and bottom end walls or flanges 16 extend from the body portion and an aperture 17 is formed in each end wall 16. The apertures break through at the corners of the end walls to leave gaps 18. In the example the gaps extend for slightly less than a quarter of the circumference of the aperture. A cover 19 encloses the trough, the cover having a web 20 on one side which fits under a side member 21 of the main body portion. On the other side, 22, there is a narrow channel which fits over the edge 23 of the back 14. The cover has end walls 24 and an aperture 27 is formed in each end wall 24. The apertures 27 open in a rearward direction to form gaps 28 which, in the example are slightly less in width than the diameter of the apertures 27. The gaps 18 are of a width to enable conductors in a trough to be eased through the gaps 18 for removal of a terminal, as described later. The gaps 28 are of a width that the cover 19 can be placed in position, with conductors in a trough the conductors passing through the gaps 28, and the gap passing over a sleeve positioned in apertures 17. The apertures 17 and 27 are aligned when the cover is in place, apertures 17 and 27 being substantially the same diameter.

A sleeve 25 is positioned in the apertures 17 in the adjacent end walls 16 of adjacent terminals, bridging the gap between two terminals. The sleeve as shown has a narrow rim at the top to prevent the sleeve falling through the apertures. The bottom aperture 17 is normally closed by a plug 26. The incoming cable normally enters through the top aperture 17 in the top terminal and conductors are led off into the individual terminals. Conductors pass from one trough 13 of one terminal to the trough of the next terminal through the sleeves 25. The incoming cable can also enter from the bottom, the conductors passing from one trough to another in a similar but reverse manner. The apertures 27 also partially enclose the sleeves 25.

Figure 2:
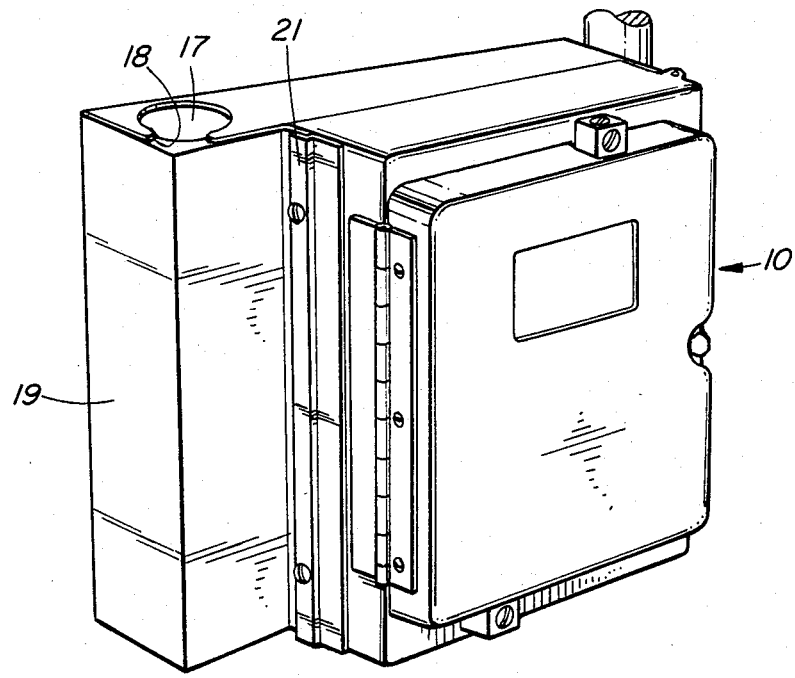
FIG. 2 is a perspective view of an entrance terminal with cover in position.
Figure 3:
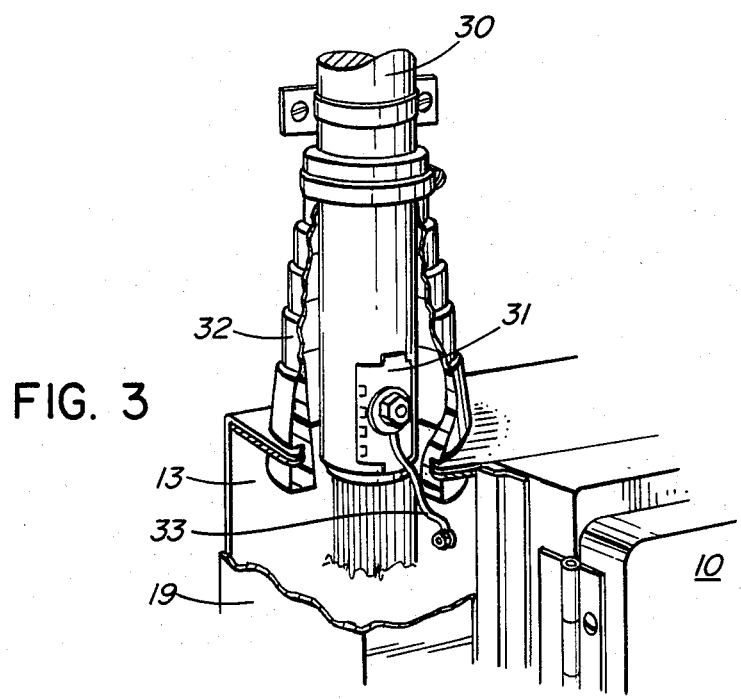
FIG. 3 is a perspective view of a cable entering at the top of a terminal.

FIG. 2 illustrates a single terminal 10 with the cover 19 in place and FIG. 3 illustrates diagrammatically a cable 30 entering a terminal. A grounding clamp 31 is attached to the metal sheath of the cable. A flexible sleeve 32 seals the cable entry into the trough 13, the sleeve being shown partly cut away in FIG. 3. A ground connection 33 is made between clamp 31 and the terminal.

When a cable is in place and the conductors extend down, or up, the troughs, some conductors are led off into the terminal, via apertures 34 (FIG. 1) the remainder continuing down, or up, to the next trough and so on. Obviously, once all the conductors have been led off into the terminals and connected to terminal members, then the array of terminals is fixed. To remove the central terminal 10, in convention arrangements, requires releasing the conductors from at least the central terminal and the terminals below. If more than three terminals are stacked then all the terminals below the one to be removed would need to be disconnected. This is to permit the conductors to be pulled out of the troughs. However, in the present arrangement, by sliding the sleeves 25 upwards out of the apertures 17, it is possible to remove one terminal, without interfering with the other terminals, as the conductors can be moved out of the trough laterally through apertures. The covers 19 are removed, the sleeves 25 slide up on the conductors, and after removal of the screws holding the terminal to the frame 11, the particular terminal is removed, the conductors being eased through the gaps 18. The conductors connected to that particular terminal will have been disconnected.

Thus by providing apertures with openings in, and positioning sleeves in the apertures, a continuous trough is provided. At the same time, by sliding up the sleeves, conductors can be moved out of the trough through the openings.

Figure 4:
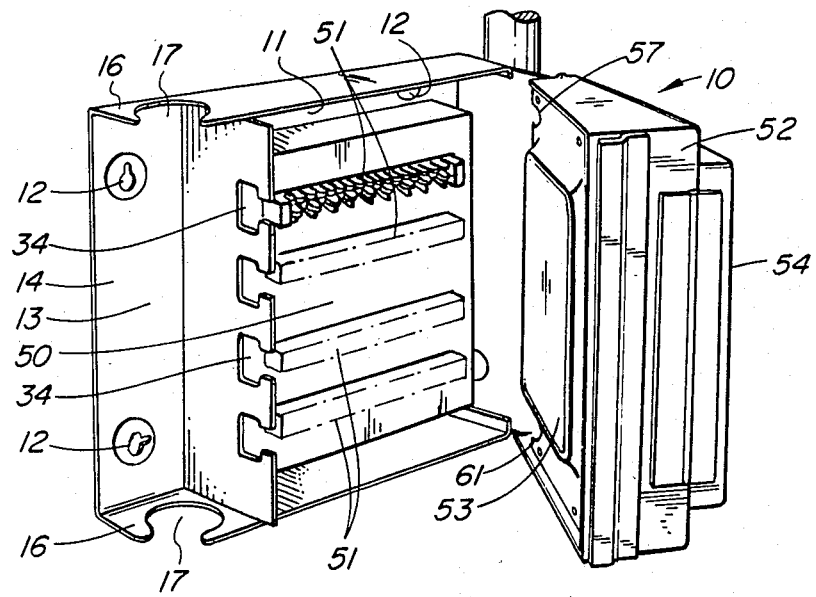
FIG. 4 is a perspective view of a terminal with the front portion open to show the connectors in the connector block.

FIG. 4 illustrates a terminal 10 in one opened condition. In FIG. 4 can be seen an interconnect block 50. This block 50 is normally attached to the back 14 of the terminal with only the front end of interconnect terminal strips 51 accessible. The front part of the body portion, shown opened, at 52 holds the protector module block. The back of the block is covered by a removable plate 53 while the protector modules themselves are accessible by a hinged front cover 54. Normally the terminal is supplied with fuse link conductors extending from the back of the block 50, and connected to appropriate terminal pins on the back of the protector module block.

Figure 5:
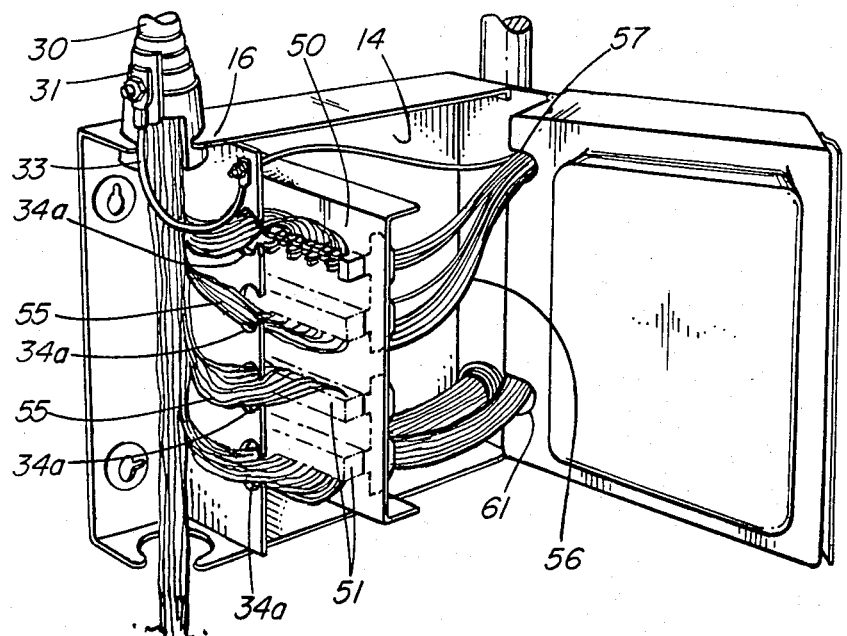
FIG. 5 is a perspective view of a terminal with the connector block hinged open, the incoming cable conductors shown connected to the front of the connectors, and also illustrating a minor modification.

Considering FIG. 5, an incoming cable 30 is seen and conductors, indicated generally at 55 are fed through the apertures 34 and connected to the terminal strips 51. The block 50 is shown opened from the back 14 to show the fuse link conductors 56 which extend from the rear of the terminal strips 51 to the terminal pins on the protector module block. The conductors 56 access to the protector module block through an opening 57 in the plate 53. A minor modification is illustrated in FIG. 5. Instead of four T-shaped apertures 34, as seen in FIG. 4, four oval apertures 34a, which break through the edge of the wall, are provided.

Figure 6:
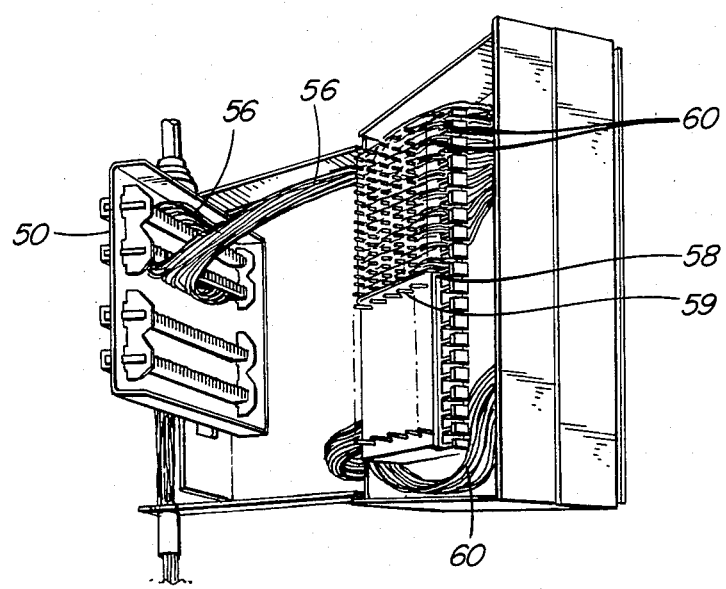
FIG. 6 is a perspective view of a terminal with the connector block more fully open than in FIG. 5 to show connection of fuse link lengths of conductor connected to the back of the connectors.

FIG. 6 shows the block 50 opened from the back 14 the rear of the block 50 being seen. Also shown is the back of the protector module block, indicated at 58, the plate 53 being removed. The conductors 56 are connected to terminal pins in the block 58, indicated at 59. In the example, the terminal pins are in rows across the block and the rows are of alternately long and short terminal pins. Such an arrangement is described in U.S. Pat. No. 4,417,781, issued Nov. 29, 1983, the disclosure of which is included herein by specific reference. Thus the fuse link conductors 56 are connected to the short pins and then a dielectric separation member in the form of a perforated sheet is placed over with the long pins extending through. Conductors of the outgoing cable, seen at 60 in FIG. 6 are connected to the long terminal pins. Voltage breakdown between the two sets of pins and conductors is thus avoided. The conductors 60 exit from the protector module block via opening 61 in plate 53 (FIGS. 4 and 5).

Figure 7:
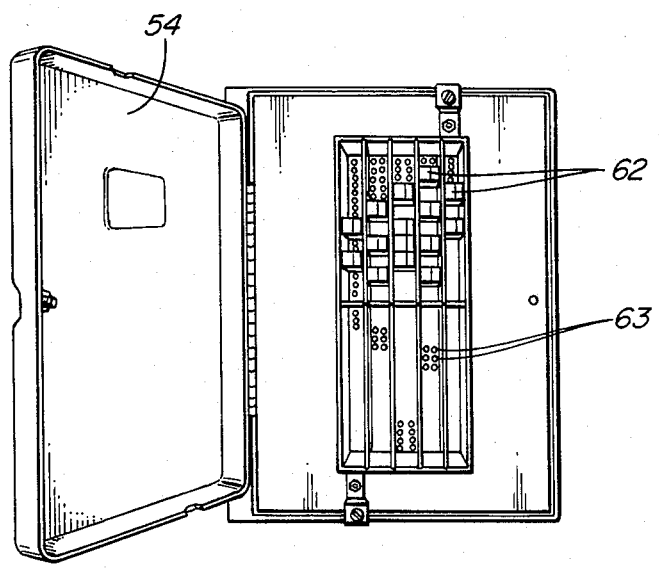
FIG. 7 is a front view of a terminal with a front panel of the front portion, showing the protector field.

FIG. 7 shows the front of a terminal with the front cover 54 open, to show the protector modules 62. The protector modules plug into tubular terminal pins 63, the rear ends of which form the terminal pins 59. Each module position has two terminals 63 with short terminal pins at the back and two terminals 63 with long terminal pins.

The terminal is normally supplied with the fuse link conductors 56, ready wired from the back of the terminal strips 51, to the short terminal pins 59 and the dielectric separator in place. An installer only connects the conductors of the incoming cable to the front of the terminal strips 51 and to the long terminal pins 59 in the protector module block.

It is arranged that the gage of the conductor for conductors 56 is smaller than that of the conductors of the incoming, and outgoing, cable. Conventionally, to localise any fusing or burning in a cable, due to overload such as lightening or power supply cables falling on a telephone cable, a short length of cable is placed in between the incoming cable and a cross-connect or interconnect terminal. The conductors of the short length, or stub cable as it is often referred to, are of a smaller gage than the conductors of the incoming cable to form a fuse link. However this stub is out in the open, usually extending along under a ceiling and down a frame. If a fire does occur, due to an overload on the cable, it can be quite dangerous and cause damage to adjacent equipment. It may only be a relatively small number of conductors which initially fuse, but the resulting burning can cause the entire cable to catch fire.

In the present example, the fuse link is formed by the conductors 56 which are contained within the terminal. Thus, at the worst, any fire is contained within the metal casing of the terminal. Also, as the conductors are separated for substantial portions of their length, fusing of some conductors need not cause others to fuse.

If such an event does occur, the incoming cable is not affected and the damaged terminal can readily be replaced as described above, without interfering with other terminals, by the particular arrangement of the troughs 13, apertures 17 and sleeves 25.

A storage member can be provided, for example at the top of a column of terminals, in which spare, or excess, conductors can be stored. Thus, if a 400 pair cable is brought in, it may be required, at least initially, that only 200 pairs, or 300 pairs, of conductors are connected. The remaining conductor pairs can be stored in the storage member, for future use. The storage member can also be at the bottom of a column.

As seen particularly in FIG. 1, the keyhole shaped holes 12 differ in orientation. While not essential, it has been found that installation is easier with the orientation as shown. After final positioning, a further screw is inserted through a hole on the other side of the terminal, not seen in FIG. 1, to finally fix the terminal in position.

The trough formation can also be applied to other forms of terminals, not having the fuse link conductors for example. The feature of easy removal and replacement is obtained, quite independently of the interior structure of the terminal, provided the incoming cable conductors, and outgoing cable conductors, can be disconnected.

What is claimed is:

1. An entrance terminal for telephone cables, comprising:

a housing, including a cable trough extending down one side of the housing, the housing including a back part and a front part hingedly connected to the back part at a side opposite to that of said trough;

said trough comprising a back member extending laterally from the back of the housing, a side member formed by a side of the housing, an end wall at each end of the trough, and a circular aperture in each end wall, the aperture breaking through an edge of the end wall to form a gap;

an interconnect block in said back part of said housing, and apertures in said side member of said trough for passage of conductors laterally from said trough to said interconnect block;

a plurality of elongate terminal strips mounted in said interconnect block and a plurality of terminal members spaced along each terminal strip and extending through said terminal strip, a back end of each terminal member accessed from the rear of the interconnect block and a front end of each terminal member accessed from the front of the interconnect block, conductors fed from said trough connected to the front ends of said terminal members;

the front portion having a protector module block mounted therein;

a plurality of terminal pins in said protector module block and extending from a rear surface of the protector module block;

means for feeding conductors from the back ends of the terminal members to preselected ones of said terminal pins;

means for mounting protector modules on a front surface of the protector module block, said means including terminals connected to said terminal pins and adapted to receive terminals on said protector modules;

a cover removably mounted on said trough to form an enclosure for passage of conductors of a cable along said trough; and a hinged front cover on said front part of said housing.

2. An entrance terminal as claimed in claim 1, including at least one sleeve mounted in one of said apertures, a formation at an upper end of a sleeve for engaging with the end wall to retain the sleeve in the aperture, the sleeve removable from the aperture by upward movement.

3. An entrance terminal as claimed in claim 1, said cover comprising a front wall and a side wall substantially normal to each other, and an end wall at each end of the cover, a circular aperture in each end wall of the cover substantially equal to that of an aperture in the end wall of the trough, the aperture in each end wall of the cover breaking through an edge of the end wall to form a gap.

4. An entrance terminal as claimed in claim 3, including a web extending laterally from said side wall of said cover, the web extending under said side member of the housing.

5. An entrance terminal as claimed in claim 3, said end walls of said cover fitting inside said end walls of said trough.

6. An entrance terminal as claimed in claim 1, said hinged front cover enclosing the front surface of the protector module block and protector modules mounted thereon, and a cover plate over the rear surface of said protector module block and said terminal pins.

7. A multiple entrance terminal assembly for telephone cables, comprising a plurality of entrance terminals mounted in closely adjacent vertical array, each terminal having a housing; a cable trough extending down one side of each terminal; each trough having a back member extending laterally from the back of the housing, a side member formed by a side of the housing and an end wall at each end of the trough, a circular aperture in each end wall, the aperture breaking through an edge of the end wall to form a gap having a width less than the diameter of the aperture; the cable troughs in alignment to form a continuous passage for conductors of a cable, the conductors passing from one trough to another through said apertures; and a sleeve positioned in the aperture in a bottom end wall of an upper terminal and extending through the immediately adjacent aperture in a top end wall of the next lower terminal, to contain conductors within the continuous passage, the sleeve having an enlarged rim at an upper end to retain the sleeve in said apertures, the sleeve movable upwards out of said apertures to permit relative lateral displacement of conductors through one of said gaps, on removal of a terminal.

8. A multiple entrance terminal assembly as claimed in claim 7 including at least three entrance terminals in vertical array; a cable entrance at a top end wall of the top first, terminal, a sleeve positioned in the aperture in the bottom end wall of the top terminal and extending through the aperture in the top end wall of the next, second, terminal and a further sleeve positioned in the bottom end wall of the next terminal and extending through the top end wall of the third terminal.

9. A multiple entrance terminal assembly as claimed in claim 7 including a cover removably mounted on each trough to form an enclosure for conductors.

10. A multiple entrance terminal assembly as claimed in claim 9, each said cover comprising a front wall and a side wall substantially normal to each other, and an end wall at each end of the cover, a circular aperture in each end wall of the cover of a diameter at least equal to the diameter of an aperture in the end wall of the trough, the aperture breaking through an edge of the end wall to form a gap at least as wide as the diameter of the aperture in an end wall of the trough.

11. A multiple entrance terminal assembly as claimed in claim 7, each said housing comprising a back part and a front part hingedly connected at a side opposite to that of said trough; an interconnect block in said back part; and apertures in the said member of said trough for passage of conductors from said trough to said interconnect block.

12. A multiple entrance terminal assembly as claimed in claim 11 each of said interconnect blocks including a plurality of elongate terminal strips mounted therein, and a plurality of terminal members spaced along each terminal strip, a back end of each terminal member accessed from the rear of an interconnect block and a front end of each terminal member accessed from the front of a terminal block, conductors feed from a trough being connected to the front ends of the terminal members, each front portion having a protector module block mounted therein; a plurality of terminal pins in each protector module block and extending from a rear surface of the protector module block; means for feeding conductors from the back ends of the terminal members to preselected ones of said terminal pins; and means for mounting protector modules on a front surface of each protector module block, said means including terminals connected to said terminal pins and adapted to receive terminals on said protector modules.

* * * * *